United States Patent Office

Re. 27,413
Reissued June 27, 1972

27,413

1 - ALKYLAMINO - 4 - ARYLAMINO-ANTHRAQUINONE SULFONIC ACID REACTIVE DYES

Hans Rudolf Schwander and Jean-Pierre Jung, Riehen, and Peter Hindermann, Bottmingen Basel-Land, Switzerland, assignors to Ciba-Geigy AG., Basel, Switzerland

No Drawing. Original No. 3,462,463, dated Aug. 19, 1969, Ser. No. 598,207, Dec. 1, 1966, which is a continuation-in-part of Ser. No. 462,073, June 7, 1965. and Ser. No. 530,351, Feb. 28, 1966. Application for reissue Sept. 1, 1970, Ser. No. 68,806

Claims priority, application Switzerland, Apr. 23, 1958, 58,664/58; Mar. 3, 1965, 2,937/65

**Int. Cl. C09b *1/40***

U.S. Cl. 260—372 5 Claims

Matter enclosed in heavy brackets [ ] appears in the original patent but forms no part of this reissue specification; matter printed in italics indicates the additions made by reissue.

ABSTRACT OF THE DISCLOSURE

Novel fiber-reactive acid anthraquinone dyestuffs are provided. Such novel dyestuffs are produced by converting amino anthraquinone dyestuffs into the valuable novel dyestuffs by the introduction of halogen, acylamino methyl groups. The novel dyestuffs are especially useful for the batch dyeing and printing of fiber material containing polyamide, especially wool. The invention also provides, as industrial products, the materials dyed and printed with the novel dyestuff.

This application is a continuation-in-part of our pending patent aplication Ser. No. 520,351, filed on Feb. 28, 1966 and of our pending patent application Ser. No. 462,073 filed on June 7, 1965 and now U.S. Patent 3,376,320, issued Apr. 2, 1968, both said pending applications being continuation-in-parts of our abandoned patent applications Ser. Nos. 261,864 and 261,865, both filed on Feb. 28, 1963, as continuation applications of our abandoned patent application Ser. No. 806,998, filed on Apr. 17, 1959.

The present invention concerns new fiber-reactive acid anthraquinone dyestuffs, processes for their production, the use thereof especially for the batch dyeing and printing of fiber material containing polyamide, especially wool, as well as, as industrial products, the materials dyed and printed therewith.

We have found that amino anthraquinone dyestuffs of the most different types can be converted into more valuable new dyestuffs by the introduction of halogen acylamino methyl groups. The reaction products according to the invention fall under the general formula

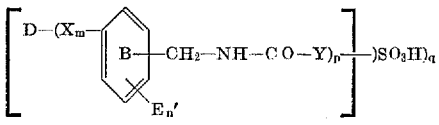

(I')

wherein:

D represents a member selected from the group consisting of α-aminoanthraquinonyl-α' - imino, anthraquinonyl-α,α'-di-imino and α,α'-diaminoanthraquinonyl-β - oxyl radicals which contain the haloalkenoylamino-methyl-phenyl-X- radical at the imino-N- and oxyl-O- atoms, X represents a bridge member consisting of a phenylene or oxyphenylene radical linked with its oxygen atom to the benzene ring B in the above formula, or thiophenylene linked with its sulfur atom to said benzene ring B or methylene-phenylene linked with its methylene moiety to said benzene ring B, the other free bond of the last mentioned three radicals, being linked to an imino group of D, $E_n'$ represents 0 to 4 identical and different nonionogenic substituents selected from the group consisting of lower alkyl, cycloalkyl, aralkyl, alkoxy, chlorine and bromine, Y represents a lower haloalkenyl or lower alkenyl radical wherein halo is chlorine or bromine, m means 0 and 1, p means 1 and 2, and q means 1 to 4.

The production of dyestuffs of Formula I' is carried out by reacting an aminoanthraquinone dyestuff which contains at least one aromatic radical having a replaceable hydrogen atom bound to the anthraquinone nucleus by a hetero atom, with the N-methyl compound of a lower molecular α- or β-halogen unsaturated fatty acid amide or with a functional derivative thereof which reacts in the same way as this methylol compound, the reaction being performed under such conditions that at least one halogen fatty acid amido methyl group is introduced. If necessary, the reaction product is then sulfonated and/or after-halogenated.

The alkenoylamino methyl groups which are characteristic to the new dyestuffs of Formula I according to the invention, and of which generally one or two are present, contain a mobile halogen atom in the alkenoyl radical, i.e. one which is easily split off in an alkaline medium by accepting the pair of electrons in the bond. The halogen atom is preferably bound in the α-position to the carbonyl group, and the alkenoyl radical itself should have not more than four carbon atoms. Chiefly chlorine and bromine are used as halogens. The α-chloro-acrylaminomethyl group is preferred, but also the α-bromo-acrylyl-aminomethyl group and the β-chloro-acrylylaminomethyl group, the β-bromo-acrylylaminomethyl group as well as the α- or β-chloro-crotonyl-aminomethyl group are useful as fiber-reactive groups in the compounds according to the invention. In these groups Y thus represents $—CCl=CH_2$, $—CBr=CH_2$, $—CH=CHCl$, $—CH=CHBr$, $—CH=CH_2$ $—HC_2—CH=CH_2$ $—CH=\underset{\underset{Cl}{|}}{C}—CH_3$, $—CH=\underset{\underset{Br}{|}}{C}—CH_3$ or $—\underset{\underset{Cl}{|}}{C}=CHCH_3$ The introduction of these unsaturated halogen fatty acid amido methyl groups into the organic dyestuffs is achieved by the reaction with N-methylol compounds of α- and β-halogen unsaturated fatty acid amides under appropriate conditions, as e.g., they were made known by A. Einhorn (A. 343, 207 (1905) and ibid. 361, 113 (1908)). This author and others have described the products of condensation from halogen unsaturated fatty acid-N-methylol amides with colorless aromatic compounds of the benzene and naphthalene series. It has now been found that also colored organic compounds, in fact aminoanthraquinone dyestuffs, enter into an Einhorn reaction. This is conditional upon these dyestuffs containing at least one hydrogen atom replaceable in the conditions in which the reaction takes place. It is preferable that the replaceable hydrogen atom should be on an aromatic ring system. The condensable aromatic radicals can be of either the carbocyclic or the heterocyclic-aromatic series, in addition they can also be mono- or poly-cyclic. The more nucleophilic they are under the reaction conditions, the more easily the condensation with the methylol compounds proceeds and the greater are the yields. The alkenoylaminomethylation can be favourably influenced by suitable nucleophilic substitution of the aromatic radical and also it is sometimes possible to determine the point at which the carbonamidomethyl group introduced is linked.

In the process according to the invention, the radical D f the anthraquinone dyestuff can be, for example, the ıdical of an α,α'-diaminoanthraquinone derivative or of ı α,α'-diamino-β-hydroxy- or -β,β'-dihydroxy-anthraquione derivative, which contains a monovalent radical usble in the Einhorn reaction, advantageously a mono- or oly-nuclear aromatic radical of the benzene series, at at ıast one of the two amino groups.

This mono- or poly-nuclear radical is, for example, an :omatic radical such as, for example, the phenyl, dihenyl ether, diphenyl sulphide, benzylphenyl or benoylaminophenyl radical; an araliphatic radical such as, ɔr example, the benzyl, phenyl ethyl or also the 1,2,3,4-ɛtrahydronaphthyl-(2) radical; or a cycloaliphatic-aroıatic radical such as, e.g. the phenylcyclohexyl radical. 'he phenyl nuclei of these radicals can contain the most ırious types of substituents, for example: alkyl, cyclolkyl, aralkyl and aryl groups such as the methyl, ethyl, :opyl, butyl, amyl, tetramethylene, cyclohexyl, benzyl, ılorobenzyl, phenyl, tolyl, xylyl and chlorophenyl :oups; ether groups such as the methoxy, ethoxy, butoxy, henoxy, tolyloxy and chlorophenyloxy groups; also :ylamino groups such as the acetylamino and benzoylnino groups; halogens such as chlorine or bromine; ıd alkylamino and arylamino groups such as the methylmino, ethylamino, benzylamino, cyclohexylamino, diıethylamino, diethylamino and phenylamino groups.

As defined, the new dyestuffs contain at least one sulɔnic acid group per dyestuff molecule. One of these ılfonic acid groups can already be present in the dyeuffs used as reaction partner such as, e.g. in the 1,4-ıaminoanthraquinone - 2-sulfonic acid derivatives. They ın often be introduced by sulfonation in a conventional ıanner before or after the Einhorn reaction. In this case ıe reaction is so performed that advantageously 1 to 2 ılfonic acid groups are introduced.

Dyestuffs containing halogen, advantageously bromine, ın also be produced by halogenating the condensation roducts.

The halogen fatty acid N-methylol amides, which acɔrding to the process employed in the invention enter ıto consideration as second reaction component, are btained by the addition of formaldehyde to α- or β-alogen unsaturated fatty acid amides with the assistance f basic condensing agents such as potassium carbonate, r else by the action of mineral acid under mild reaction ɔnditions. In the process under review it is above all ıe N-methylol compounds of α-chloroacrylylamide, α-romoacrylylamide, β-chloro crotonic acid amide, β-ıloro- and β-bromo-acrylic acid amide which are of nportance. N-methylol α-chloroacrylylamide is the ıactant to be preferred, both in consideration of its ısy accessability and with regard to the good quality ; dyes of the end products obtained by its use.

The condensation of the dyestuffs with the methylol ɔmpounds takes place in the presence of acid condensing ;ents or agents splitting off water which react in the ıme way. Among these, concentrated hydrochloric acid, nc chloride, phosphorus pentoxide, acetic acid anhy:ide, syrupy phosphoric acid and fuming sulfuric acid :e particularly applicable. The condensing agent to be :eferred, however, is sulfuric acid concentrated until ıhydrous, as normally it can be used at the same time ; a solvent for the reactants. The temperature at which ıe reaction takes place may vary within a wide range and ɛpends above all on the condensing agent used. In ɔncentrated sulfuric acid, the reaction will normally :oceed quickly and completely even at room temper:ure. In some cases it is necessary to work at a higher mperature, e.g. from 40–80° C., particularly when :veral carbon amido-methyl groups are to be introıced. It must be predicated however, that the reactants . these conditions are not broken down, and that if ɛcessary the occurrence of sulfonation of the product : the reaction is admissible. The final products of the reaction are separated by pouring the solutions or suspensions in sulfuric acid into ice-water, and isolated in the usual manner.

In place of the halogen unsaturated fatty acid-N-methylol amides, reactive functional derivatives of these methylol compounds may be used, insofar as they react analogously. For example, the esters obtained by treating the methylol compounds with inorganic or organic acids or acid halides or anhydrides come under this heading, as do the di-(unsaturated fatty acid amido-methyl)-ethers obtained by self-condensation in the presence of, e.g., phosphorus oxychloride. As however, these functional derivatives must be prepared from the methylol compounds, the method mentioned first is ordinarily preferred. Nevertheless, in individual cases in which the Einhorn-like process does not lead to satisfactory results, it is possible to achieve the desired end by means of these derivatives, above all with the N-chloromethyl amides. In some cases it is possible to simplify the process according to the invention by utilizing for the reaction in one step a mixture of the dyestuff with formaldehyde and the halogen fatty acid amide, instead of proceeding from the prepared methylol derivatives of the amides.

A modified method for the production of dyestuffs according to the invention consists in using as a component for the synthesis of the dyestuffs a carbocyclic or heterocyclic aromatic compound which contains at least one α- or β-halogen unsaturated fatty acid amido-methyl group, but does not necessarily possess the character of a dyestuff. Such an aromatic compound and an anthraquinone compound each containing a reactive substituent, which in reacting become bound to each other, may for example be allowed to act upon each other. Reactive substituents of this kind are on the one hand the amino or hydroxyl group and on the other for example the carboxylic acid halide or sulfonic acid halide groups. Corresponding carboxylic acid halides are obtained by condensation of an aryl carboxylic acid with a halogen unsaturated fatty acid-N-methylol amide according to Einhorn and conversion of the condensation product into the acid chloride, whilst corresponding sulfonic acid chlorides are obtained by reacting chlorosulfonic acid with the condensation product from aromatic hydrocarbons with halogen unsaturated fatty acid-N-methylol amides. It is also possible to treat an anthraquinone dyestuff carboxylic acid or sulfonic acid halide with a hydroxy or aminoaryl compound which contains an α- or β-halogen alkenyl carbonyl amino-methyl group, and if necessary to sulfonate the product of the condensation. In all cases the treatment and isolation of the products of the reaction is to be undertaken in the most suitable conditions possible, so that the halogen atom linked to the fatty acid radical is not split off.

In accordance with a preferred aspect of this invention, particularly valuable acid anthraquinone dyestuffs are obtained by reacting one mol of a 1,4 - diaminoanthraquinone compound of the formula

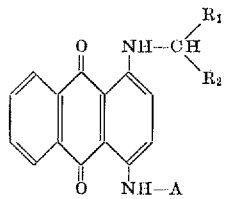

(1)

wherein:

A represents the radical of an optionally further substituted diphenyl alkane, diphenyl cycloalkane, diphenyl ether or diphenyl thioether which is bound to the nitrogen by a carbon atom in the ring and which contains at least two replaceable hydrogen atoms in the nucleus, and $R_1$ and $R_2$ each represent a lower, optionally substituted alkyl group or both taken together with the

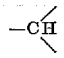

group to which they are linked, represent the cyclohexyl group, with mmol of a compound of Formula II

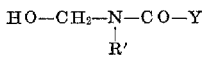

(II)

wherein:

R′ represents hydrogen or a lower alkyl radical and Y has the same meaning as given hereinbefore or of a functional reactive derivative of the compound of Formula II under the conditions of the Einhorn reaction mentioned supra, and previously, simultaneously or subsequently, sulphonating to form an anthraquinone dyestuff mixture of the average composition of Formula III

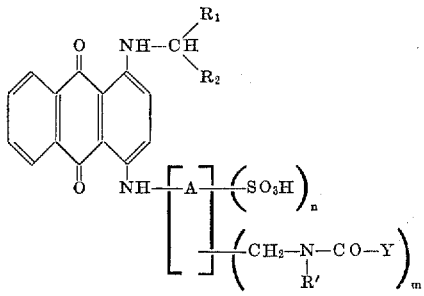

(III)

wherein:

A, $R_1$ and $R_2$ have the meanings given in Formula I and R′ and Y have those given in Formula II and n and m each represent a number ranging from about 1 to 2, preferably however, about 1.

The radical A is preferably bound to the nitrogen by means of a ring carbon atom in the p-position to the bridging member, namely in the p-position to the alkylene, cycloalkylene, —O— and —S— bridge, respectively.

As diphenyl alkane radical, A is, for example, the radical of a 1,1- or 1,2-diphenylethane, 2,2-diphenylpropane and, particularly, of a diphenylmethane; as diphenyl cycloalkane radical A is, e.g. the radical of a 1,1-diphenyl cyclohexane. Substituents in the diphenyl alkane, diphenyl cycloalkane, diphenyl ether and diphenylthioether radical A are, principally, low alkyl groups such as the methyl or ethyl group, low alkoxy groups such as the methoxy or ethoxy group, and halogens up to the atomic number 35, e.g., fluorine, chlorine or bromine. If A is bound to the nitrogen by a ring carbon atom in p-position to the bridging member, then it can contain a phenoxy group in the o-position to the nitrogen bond.

Preferably the radical A is a diphenyl ether radical bound to the nitrogen in p-position to the ether oxygen atom.

The low alkyl groups in the positions of $R_1$ and $R_2$ have 1 to 6 and preferably 1 to 4 carbon atoms. When these alkyl groups are substituted then substituents are, e.g. the phenyl or cyclohexyl group; preferably however, they are unsubstituted.

R′ advantageously represents hydrogen, otherwise it is a low alkyl radical containing at most 4 carbon atoms, especially a methyl group.

When Y is an alkenyl group then this advantageously has 2 or 3 carbon atoms and not more than one double bond. It thus represents, for example, the groups:

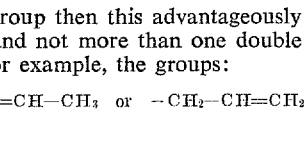

These alkenyl groups contain preferably substituents which can be split off as an ion, particularly as an anion, principally halogens such as chlorine or bromine. Examples of alkenyl groups in the position of Y which are substituted in this manner are the groups:

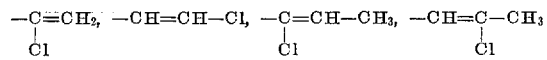

and the corresponding bromine analogs.

In preferred acid anthraquinone dyestuffs of Formula III, Y represents the group

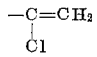

Some of the starting materials of Formula I are known, or they can easily be produced in the known way by reacting 1-chloro-, 1-bromo- or 1-sulphonic acid-anthraquinone with an amine of the formula

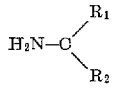

wherein $R_1$ and $R_2$ have the meanings given in Formula I, to form the corresponding 1-(sec. alkylamino)-anthraquinone, halogenating this to form 1-(sec. alkylamino)-4-chloro- or -4-bromo-anthraquinone, or 1-cyclohexylamino-4-chloro- or -4-bromo-anthraquinone, which compound is then reacted with an amine of the formula $H_2N$—A wherein A has the meaning given in Formula I.

The compounds of Formula II are obtained, for example, by adding formaldehyde to the amides of the formula

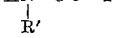

in the presence of basic condensing agents such as potassium carbonate. Reactive functional derivatives of compounds of Formula II are principally the corresponding N-chloromethyl- or N-bromomethyl amides. They are obtained, e.g. by treating the methylol amides of Formula II with thionyl chloride or thionyl bromide. Other suitable derivatives of the methylolamides of Formula II are, e.g. the di-(carboxylic acid amidomethyl)-ethers obtained by condensation of these methylol compounds in the presence of, e.g. phosphorus oxychloride.

As these reactive derivatives have to be produced from the methylol compounds of Formula II, the latter are to be preferred.

Instead of the compounds of Formula II or their reactive derivatives, in some cases a mixture of α,α′-dichloro- or α,α′-dibromo-dimethyl ether with the corresponding amides of formula

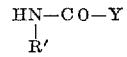

in some cases also with the nitriles of formula N≡C—Y (which are saponified to form the amides mentioned under the reaction conditions) can be used. Examples of such nitriles are acrylonitrile, methacrylonitrile or α- or β-chloroacrylonitrile. (This method of performing the process according to the invention is described, for example, in the following Belgian Patents: 603,420, 612,417, 613,037, 625,916, 628,442, 628,932, 630,205.)

The 1,4-diamino-anthraquinone compounds of Formula I are advantageously first sulphonated and then reacted with the compound of Formula II or with a reactive derivative or with a mixture of the precursors thereof mentioned above. The starting materials of Formula I are sulphonated by the usual methods in concentrated sulphuric acid or oleum, preferably under mild temperature conditions, e.g. at room temperature.

The reaction of unsulphonated or sulphonated compounds of Formula I with the compound of Formula II or its reactive derivatives or mixture of precursors is advantageously perforated in the presence of acid condensing agents or agents which split off water and react in the same way. Examples of such condensing agents are concentrated hydrochloric acid, zinc chloride, phosphorus pentoxide, acetic acid anhydride, syrupy phosphoric acid and oleum. The preferred condensing agent, however, is oncentrated to anhydrous sulphuric acid. A technically articularly simple and, therefore, preferred embodiment f the invention consists in sulphonating and condensing he reaction partners in the same concentrated sulphuric cid without isolating intermediate products. The condenation temperature can vary within wide limits and deends chiefly on the condensing agent used. In concenrated sulphuric acid, the reaction occurs quickly and ompletely usually at room temperature; in some cases a lightly raised temperature is necessary. The finished rection products are separated by pouring the sulphuric cid solutions or suspensions into ice water and convertng in the usual way into the water soluble alkali metal alts, whereupon the latter are isolated.

The acid anthraquinone dyestuffs of Formula III acording to this aspect of the invention dissolve well, even n hard water. They are suitable for the dyeing and printng of natural and synthetic fiber material containing olyamide such as silk superpolyamide and superpolyrethane fibers, but, in particular, wool and also leather. hey have very good affinity to these fibers, have good owers of penertation and migration and draw very even- onto these materials from an acid, weakly acid or eutral aqueous bath and produce fast greenish blue, blue r reddish blue dyeings thereon which have good fastness wet media, especially fastness to washing, milling and erspiration, especially in the alkaline range, and they are articularly fast to light. They can be combined well with uitable yellow wool dyestuffs and, with these, yields a dyetuff mixture having well balanced absorption power. They re superior to previously known dyestuffs of similar contitution with regard to their powers of combination with ellow wool dyestuffs.

Compared with structurally similar dyestuffs which may ontain a halogenated lower alkanoylamino group such s Cl—$CH_2$—CO—NH— group as fiber-reactive groupng, the preferred dyestuffs according to the invention re distinguished by a much better migratory power. This very surprising, as fiber-reactive dyestuffs which have ery good wet fastness properties such as fastness to washng, and also have a good migratory power are very unsual.

Most preferred in view of their superior light-fastness n polyamide fibers, especially on wool and silk, and eir level drawing on these fibers, when dyeing them reen shades with blended dyes in which dyestuffs accordng to the invention represent the blue compound, are ose of the latter dyestuffs which fall under the formula

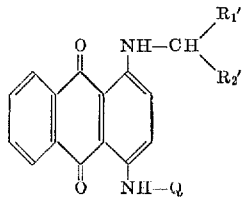

(IV)

herein:

$R_1'$ represents methyl, and
$R_2$ represents methyl or ethyl, or
$R_1$ and $R_2$ taken together with the

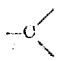

roup to which they are linked, represent cyclohexyl, and wherein Q represents phenoxyphenyl, alkyl-substituted phenoxy-phenyl, bromo-substituted phenoxy-phenyl, chloro-substituted phenoxy-phenyl, phenylthio-phenyl, alkyl-substituted phenylthio-phenyl, chloro-substituted phenylthio-phenyl, bromo-substituted phenylthio-phenyl, benzyl-phenyl, alkyl-substituted benzyl-phenyl, chloro-substituted benzyl-phenyl and bromo-substituted benzyl-phenyl, alkyl in the aforesaid radicals substituted therewith having from 1 to 5 carbon atoms, and wherein Q is substituted at a ring carbon atom thereof with one —$CH_2$—NH—CO—Y fiber-reactive grouping, wherein Y represents the groupings mentioned hereinbefore, and preferably chloro- or bromo-substituted lower alkenyl, more especially.

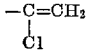

and wherein Q is substituted at from one to two ring carbon atoms thereof, which ring carbon atoms are free from the last-mentioned fiber-reactive grouping, by, respectively, from one to two sulfonic acid groups.

Compared with structurally similar dyestuffs which contain an n-propylamino or n-butylamino group in 1-position at the anthraquinone nucleus, the preferred compounds according to the invention are distinguished by a completely unexpected 50% to 100%—or even greater increase in light fastness especially on wool.

To summarize, dyestuffs falling under Formula IV of this invention and having identical dyeing properties are produced (a) By sulfonating the corresponding dyestuff of the formula

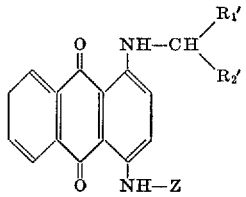

(V)

wherein Z represents otherwise unsubstituted phenoxyphenyl, alkyl-substituted phenoxy-phenyl, bromo-substituted phenoxy-phenyl, chloro-substituted phenoxy-phenyl, phenylthio-phenyl, alkyl-substituted phenylthio-phenyl, chloro-substituted phenylthio-phenyl, bromo-substituted phenylthio-phenyl, benzyl-phenyl, alkyl-substituted benzyl-phenyl, chloro-substituted benzyl-phenyl and bromo-substituted benzyl-phenyl, alkyl in the aforesaid radicals substituted therewith having from 1 to 5 carbon atoms, sufficiently strongly to introduce from about 1 to 2 —$SO_3H$ groups into the grouping Z, and reacting the resulting sulfonated dyestuff with, per mol thereof, about one mol of a reactant selected from the class consisting of an N-methylol compound of the formula

Y—CO—NH—$CH_2$—OH wherein Y has the foregoing meaning, a reactive ester of said compound and an inorganic acid, and the condensation product of a compound of the formula Y—CN wherein Y has the foregoing meaning and a dihalogeno-dimethyl ether, in the presence of a Friedel-Crafts condensing agent under the conditions of the Einhorn reaction, said Friedel-Crafts condensing agent being preferably concentrated sulfuric acid; or (b) Reacting the corresponding dyestuff of Formula V with, per mol thereof, about one mol of a reactant selected from the class consisting of a compound of the formula Y—CO—NH—$CH_2$—OH wherein Y has the foregoing meaning, a reactive ester of said N-methylol compound and an inorganic acid, and the condensation product of a compound of the formula Y—CN wherein Y has the foregoing meaning and a dihalogenodimethyl ether, in the presence of a Friedel-Crafts condensing agent and then sulfonating the resulting fiber reactive dyestuff sufficiently strongly to introduce from about 1 to 2 —$SO_2H$ groups into the grouping Z.

Optimal results are obtained with the anthraquinone dyestuffs of the Formula IV in which the 1-position of the anthraquinone nucleus is occupied by isopropylamino, and more particularly those of the formula

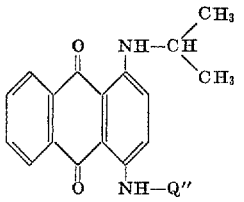

(VI)

wherein Q″ represents p-phenoxyphenyl, methyl-substituted p-phenoxyphenyl, p-phenylthiophenyl or methyl-substituted p-phenylthiophenyl, Q″ being linked with its phenyl moiety to the adjacent —NH bridge, and wherein Q″ is substituted by one —$SO_3H$ group and by one

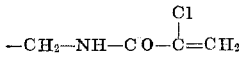

group, each of which groupings

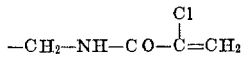

and —$SO_3H$ is linked to a different carbon atom of Q″;

which is further purified by recrystallization from n-butanol. The pure dyestuff which corresponds to the formula

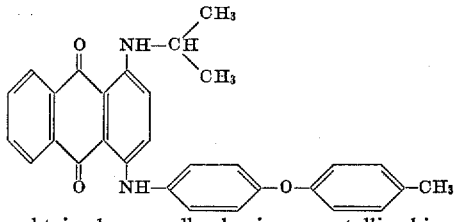

(a)

is thus obtained as needles having a metallic shimmer. It melts at 172°.

(b) 46.2 g. of 1,4-diamino-anthraquinone of the Formula (a) supra are added to 460 g. of sulfuric acid monohydrate and the solution obtained is stirred for 18 hours at a temperature of 23–25°. 14.90 g. of N-methylol α-chloro-acryloyl amide are then added to this solution. The mixture is stirred for 24 hours at the same temperature, then poured onto a mixture of ice and sodium chloride and the precipitate formed is filtered off. The filter residue is washed with 10% sodium chloride solution and again filtered with good suction. The filter residue is then slurried in a little water, the pH of the slurry is adjusted carefully to 7 by the addition of sodium hydroxide solution and the dyestuff is salted out with sodium chloride, filtered off and dried in vacuo at 60°.

The dyestuff so obtained corresponds to the formula

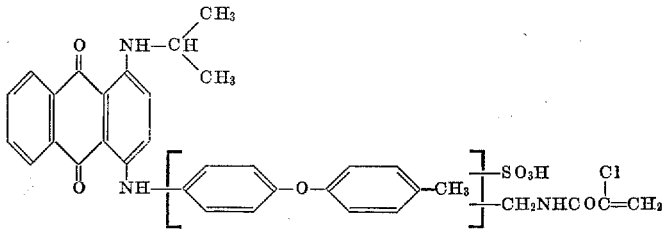

these dyestuffs dye wool and man-made polyamide fibers in greenish-blue shades, which, apart from the aforementioned superior light fastness, are particularly wet-fast, and especially fast to washing, e.g. in water, and to alkaline milling. In addition to said wet fastness properties these dyestuffs show an especially good migratory power.

The following non-limitative examples further illustrate the invention. The temperatures are given in degrees centigrade. Parts and percentages are by weight unless expressly stated otherwise.

EXAMPLE 1

(a) 45 g. of 4-amino-4′-methyldiphenyl ether, 34.4 g. of 1-isopropylamino-4-bromoanthraquinone and 10 ml. of ethylene glycol monoethyl ether are placed in a flask fitted with a stirrer and the mixture is heated to 100° whereupon a red melt is obtained. 9.90 g. of anhydrous potassium acetate, 0.01 g. of cuprous chloride and 0.2 ml. of water are added and the whole is stirred for 20 hours at a temperature of 100–102° while passing a stream of nitrogen over the surface of the melt. 160 ml. of normal aqueous hydrochloric acid heated to 90° are then poured into the mixture and the whole is stirred for some time at 85° until the end product separates in crystalline form. This is filtered off at 80°, washed with hot normal aqueous hydrochloric acid and then with water until the filtrate has a neutral reaction and finally with methanol. After drying, a crude product is obtained as a blue powder and consists of a mixture of all the isomers falling under the above formula.

It is a blue powder which dissolves easily in water and dyes wool and nylon from a neutral to weakly acid bath a very level greenish blue. The dyeings obtained have good wet fastness properties, especially fastness to washing and milling, fastness to perspiration and also light fastness. In addition to said fastness properties the reactive dyestuff obtained according to the example has a very good migratory power.

While it is possible to isolate the isomers constituting the above dyestuff by known chromatographic techniques, and to identify the position of fiber-reactive Einhorn group and sulfonic acid group in each isomer from its magnetonuclear resonance spectrum, such further workup will not lead to products of improved properties, and is, moreover, highly uneconomical, so that it is of no practical value.

The same applies to the dyestuffs described hereinafter; they are mixtures of all the isomers falling under the respective formulas representing them, such mixtures being useful dynestuffs.

If with otherwise the same procedure, instead of the 1,4-diamino-anthraquinone of the first formula given above, equivalent amounts of a 1,4-diamino-anthraquinone obtained by condensation of one of the 1-(sec. alkylamino)-4-halogen-anthraquinones given in column I of Table I with one of the aminodiphenyl ethers, aminodiphenyl thioethers, aminodiphenyl alkanes or aminodiphenylcycloalkanes given in column II of the same table are used, then dyestuffs having similar properties are obtained.

TABLE I
| No. | I | II | Wool dyeings |
|---|---|---|---|
| -------- | 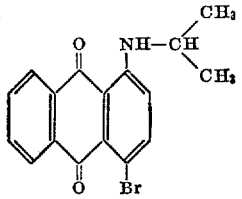 | 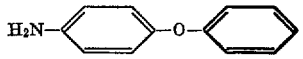 | Greenish blue. |
| -------- | 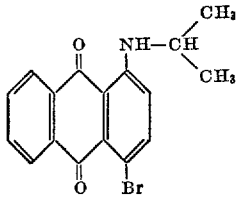 | 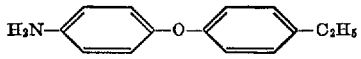 | Do. |
| -------- | 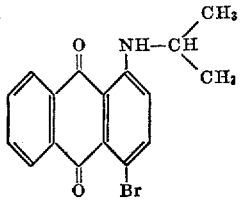 | 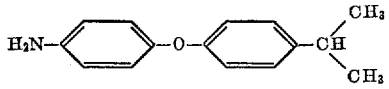 | Do. |
| -------- | 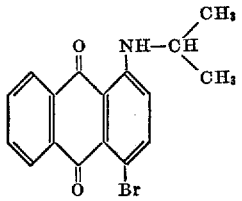 | 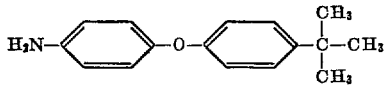 | Do. |
| -------- | 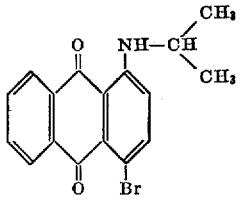 | 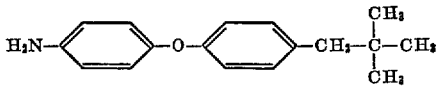 | Do. |
| -------- | 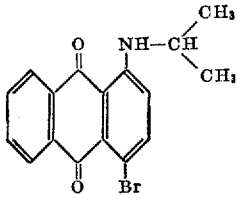 | 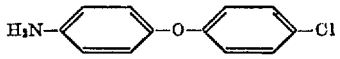 | Do. |
| -------- | 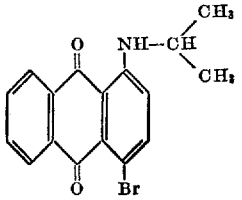 | 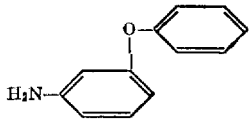 | Do. |
| -------- | 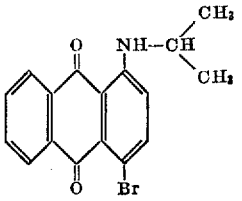 | 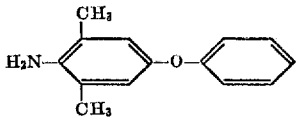 | Reddish blue. |

TABLE I—Continued
| No. | I | II | Wool dyeings |
|---|---|---|---|
| 10 | 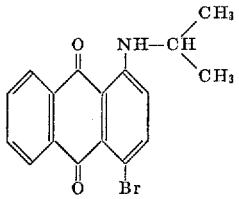 | 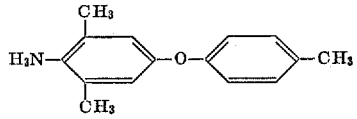 | Reddish blue. |
| 11 | 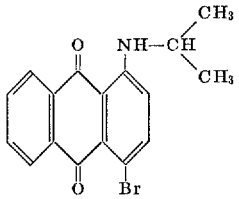 | 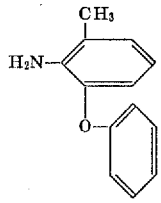 | Do. |
| 12 | 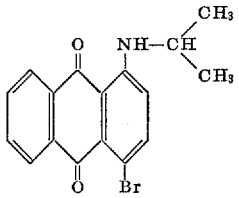 | 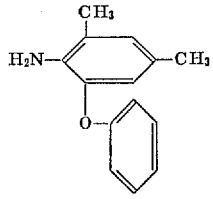 | Do. |
| 13 | 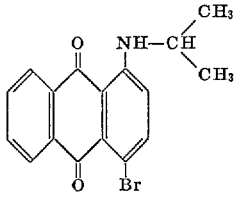 | 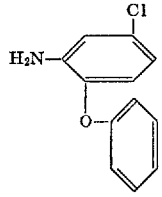 | Blue. |
| 14 | 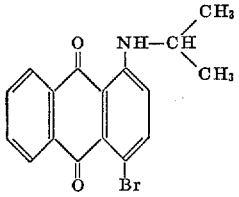 | 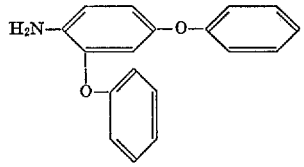 | Do. |
| 15 | 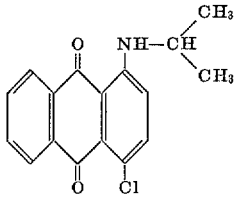 | 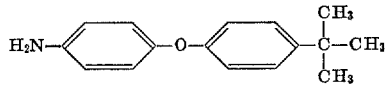 | Greenish blue. |
| 16 | 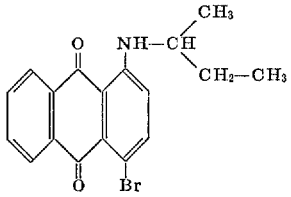 | 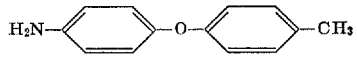 | Do. |
| 17 | 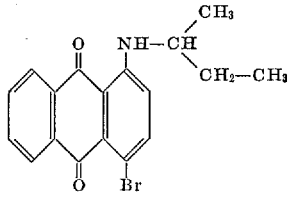 | 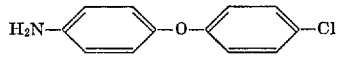 | Do. |

TABLE I—Continued
| No. | I | II | Wool dyeings |
|---|---|---|---|
| 3------- | 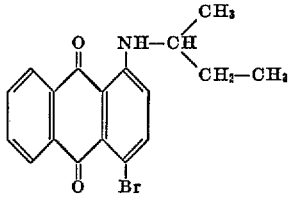 | 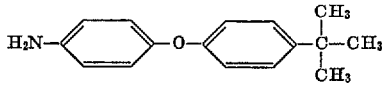 | Greenish blue. |
| )------- | 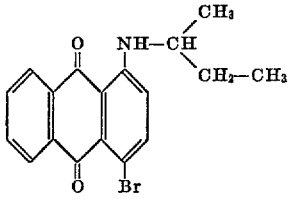 | 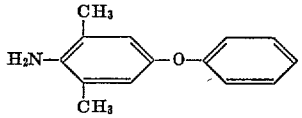 | Reddish blue. |
| )------- | 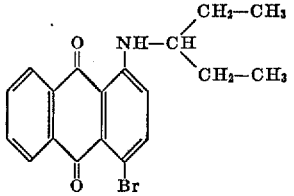 | 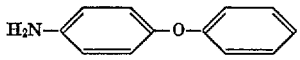 | Greenish blue. |
| ------- | 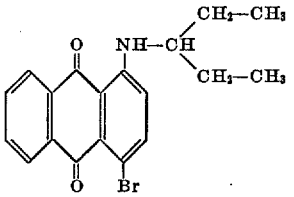 | 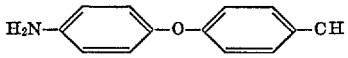 | Do. |
| ------- | 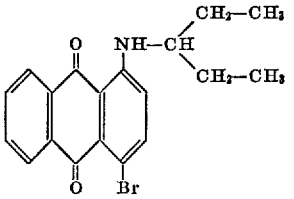 | 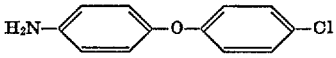 | Do. |
| ------- | 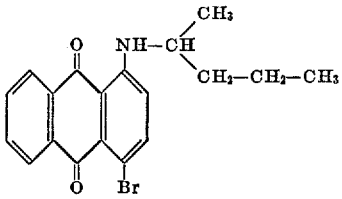 | 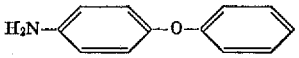 | Do. |
| ------- | 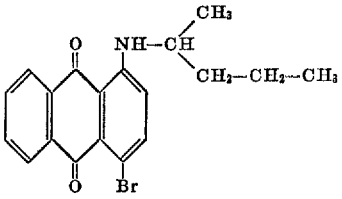 | 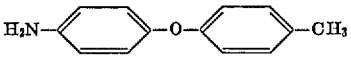 | Do. |
| ------- | 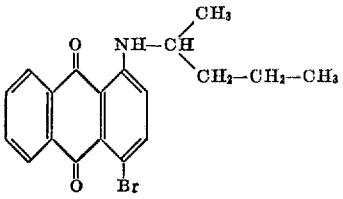 | 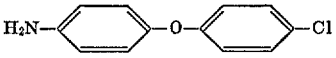 | Do. |

TABLE I—Continued
| No. | I | II | Wool dyeings |
|---|---|---|---|
| 26 | 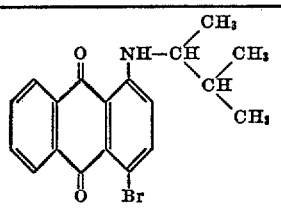 | 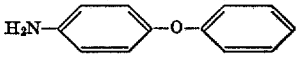 | Greenish blue. |
| 27 | 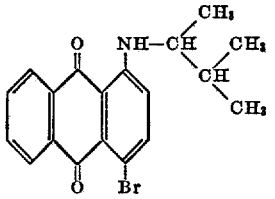 | 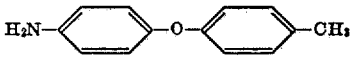 | Do. |
| 28 | 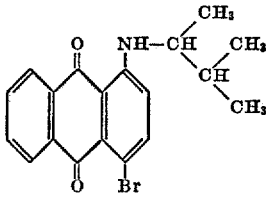 | 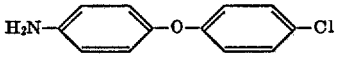 | Do. |
| 29 | 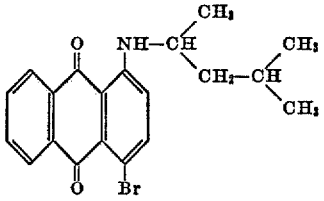 | 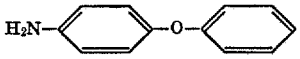 | Do. |
| 30 | 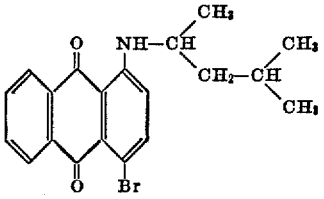 | 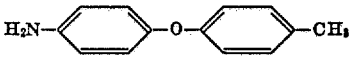 | Do. |
| 31 | 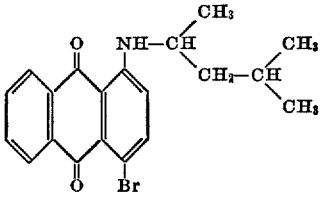 | 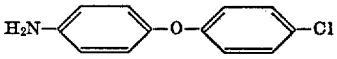 | Do. |
| 32 | 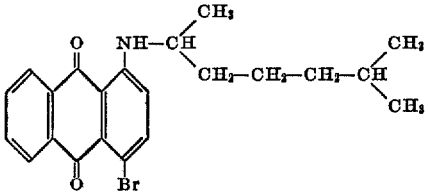 | 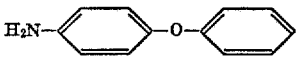 | Do. |
| 33 | 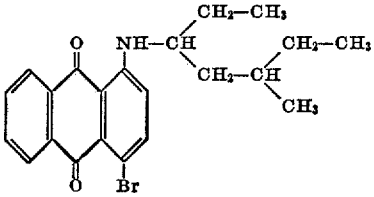 | 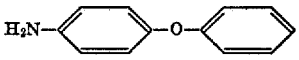 | Do. |

TABLE I—Continued
| No. | I | II | Wool dyeings |
|---|---|---|---|
| 4 | 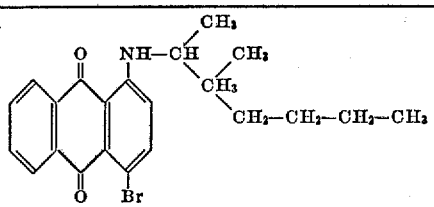 | 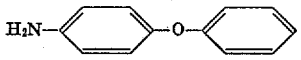 | Greenish blue. |
| 5 | 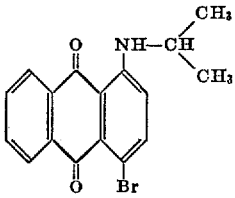 | 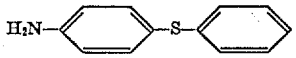 | Do. |
| 6 | 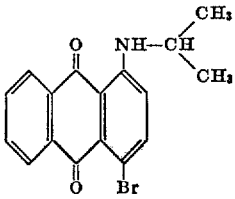 | 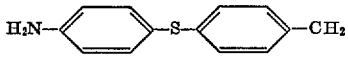 | Do. |
| 7 | 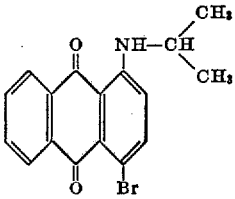 | 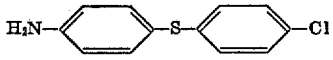 | Do. |
| 8 | 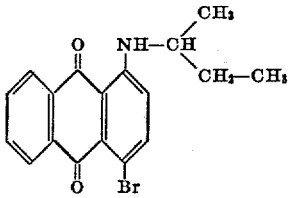 | 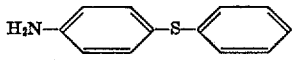 | Do. |
| 9 | 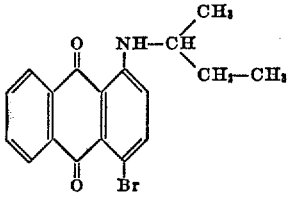 | 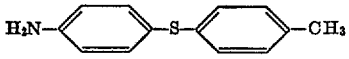 | Do. |
| 10 | 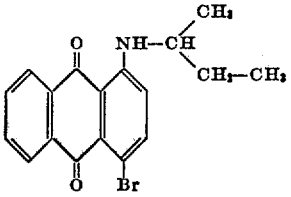 | 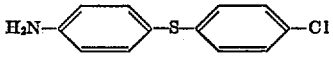 | Do. |
| 11 | 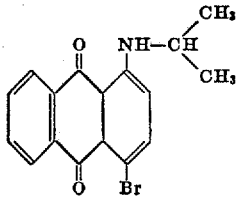 | 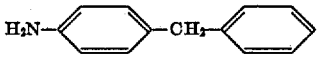 | Do. |

TABLE I—Continued
| No. | I | II | Wool dyeings |
|---|---|---|---|
| 42 | 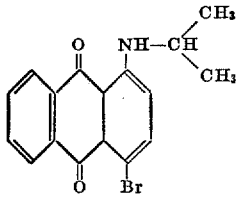 | 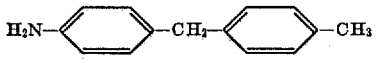 | Greenish blue. |
| 43 | 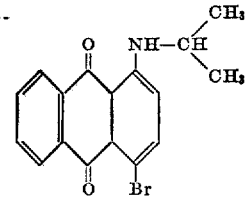 | 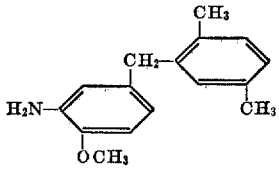 | Do. |
| 44 | 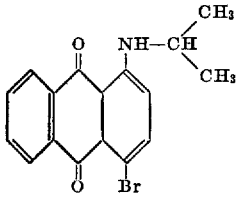 | 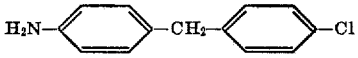 | Do. |
| 45 | 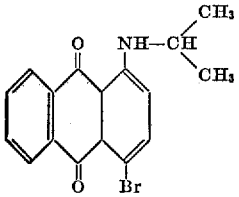 | 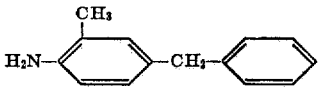 | Do. |
| 46 | 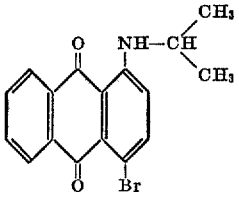 | 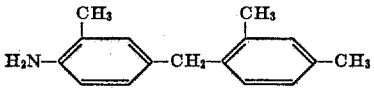 | Do. |
| 47 | 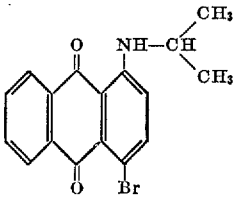 | 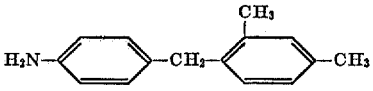 | Do. |
| 48 | 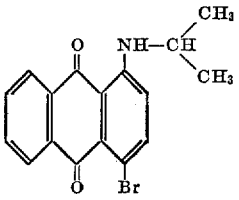 | 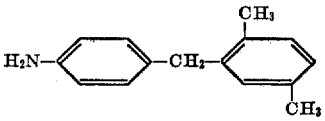 | Do. |
| 49 | 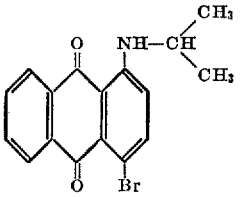 | 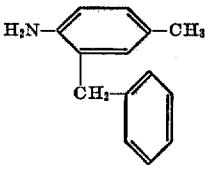 | Do. |

TABLE I—Continued
| No. | I | II | Wool dyeings |
|---|---|---|---|
| 0 | 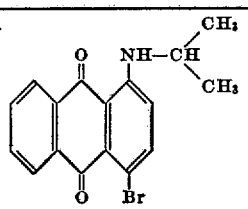 | 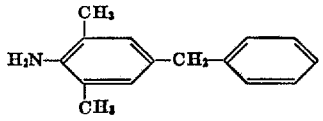 | Reddish blue. |
| 1 | 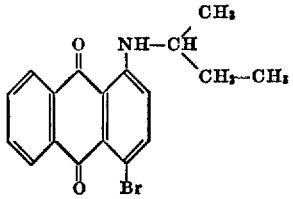 | 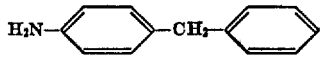 | Greenish blue. |
| 2 | 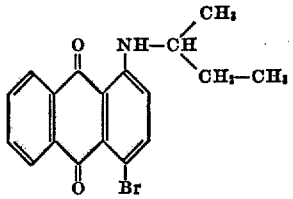 | 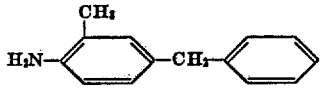 | Do. |
| 3 | 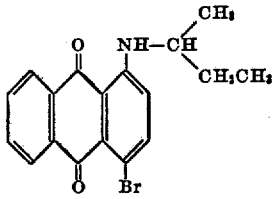 | 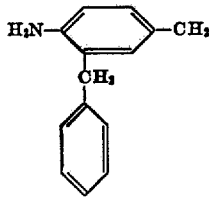 | Do. |
| 4 | 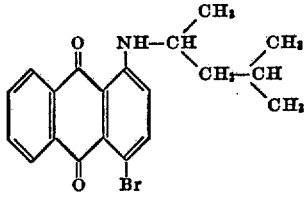 | 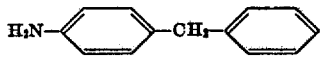 | Do. |
| 5 | 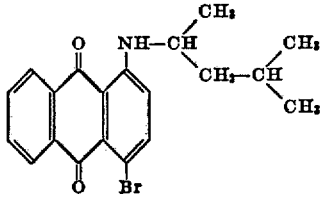 | 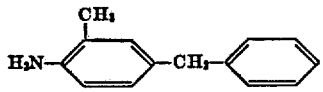 | Do. |
| 6 | 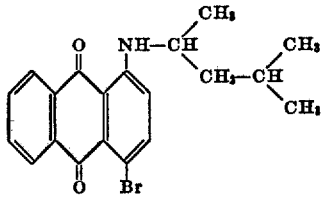 | 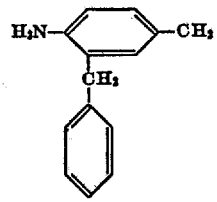 | Do. |
| 7 | 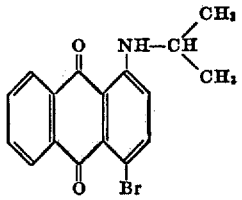 | 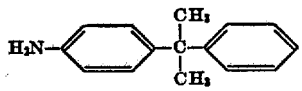 | Do. |

TABLE I—Continued
| No. | I | II | Wool dyeings |
|---|---|---|---|
| 58 | 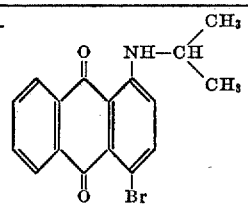 | 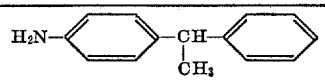 | Greenish blue. |
| 59 | 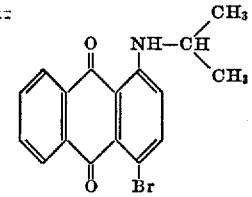 | 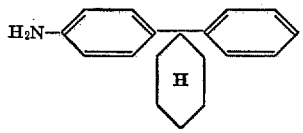 | Do. |
| 60 | 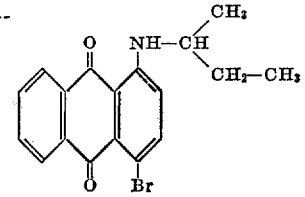 | 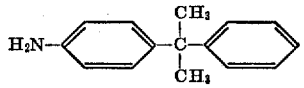 | Do. |
| 61 | 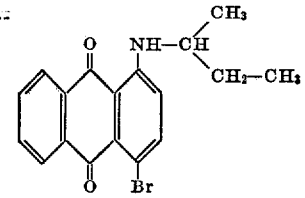 | 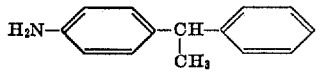 | Do. |
| 62 | 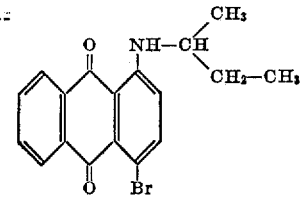 | 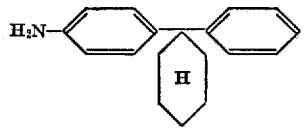 | Do. |
| 63 | 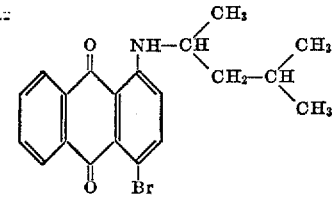 | 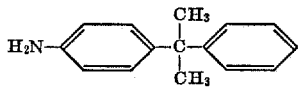 | Do. |
| 64 | 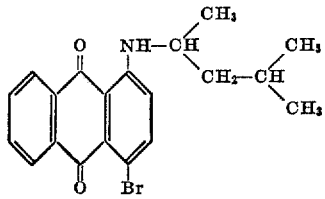 | 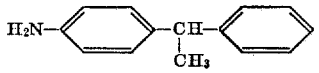 | Do. |
| 65 | 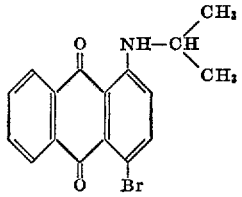 | 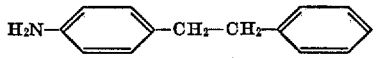 | Do. |

TABLE I—Continued
| No. | I | II | Wool dyeings |
|---|---|---|---|
| 6 | 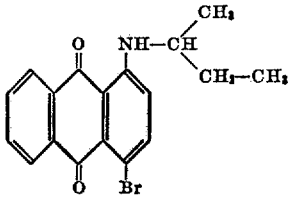 | 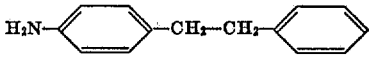 | Greenish blue. |
| 7 | 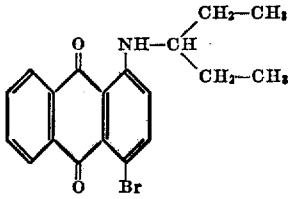 | 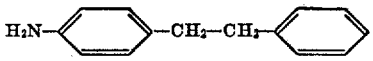 | Do. |
| 8 | 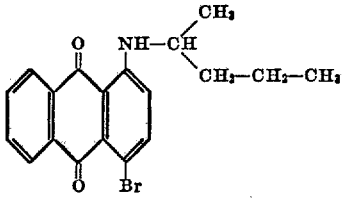 | 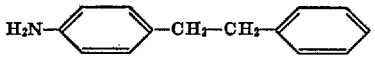 | Do. |
| 9 | 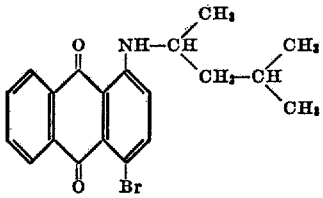 | 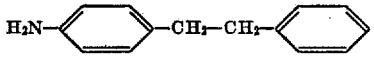 | Do. |
| 0 | 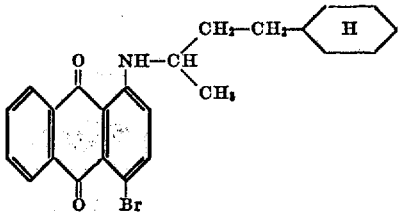 | 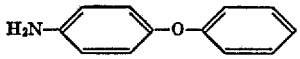 | Do. |
| 1 | 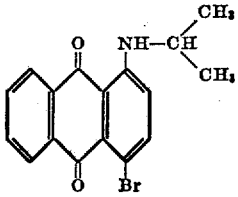 | 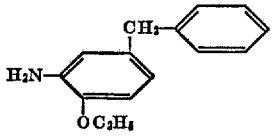 | Do. |
| 2 | 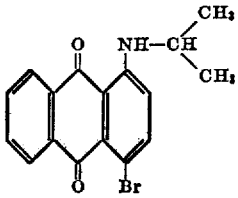 | 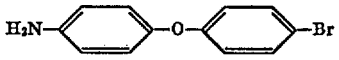 | Do. |
| 3 | 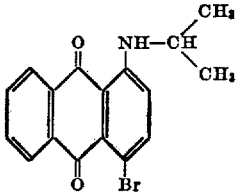 | 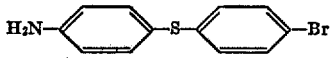 | Do. |

TABLE I—Continued

| No. | I | II | Wool dyeings |
|---|---|---|---|
| 74 | 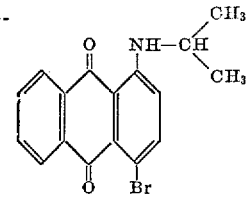 | 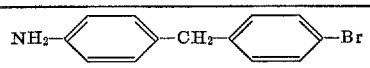 | Greenish blue. |

The 1 - (sec. alkylamino) - 4 - halogen - anthraquinones given in column I of Table I are obtained for brominating or chlorinating the corresponding 1-(sec. alkylamino)-anthraquinones with elementary bromine or with sulphuryl chloride in a solvent not taking part in the reaction, e.g. o-dichlorobenzene or nitrobenzene. The 1-(sec. alkylamino)-anthraquinones are produced in their turn by reacting 1-chloro- or 1-bromo-anthraquinone with the corresponding sec. alkylamine at 140–150°, in an autoclave if necessary.

Dyestuffs having similar properties are also obtained if, in the examples given above, equivalent amounts of the N-methylol amides given in the following Table II are used with otherwise the same procedure instead of N-methylol α-chloro-acrylylamide:

TABLE II

| | |
|---|---|
| 75 | $H_2C{=}C(Br){-}CONH{-}CH_2OH$ |
| 76 | $ClCH{=}CH{-}CONH{-}CH_2OH$ |
| 77 | $H_2C{=}CH{-}CONH{-}CH_2OH$ |
| 78 | $H_2C{=}C(CH_3){-}CONH{-}CH_2OH$ |
| 79 | $H_3C{-}CH{=}C(Cl){-}CONH{-}CH_2OH$ |
| 80 | $H_3C{-}C(Cl){=}CH{-}CONH{-}CH_2OH$ |

EXAMPLE 81

46.2 g. of 1,4-diamino-anthraquinone of the formula

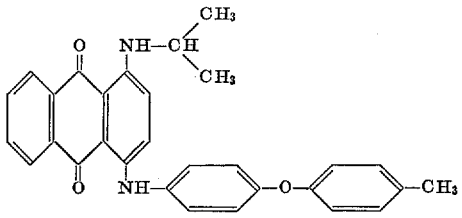

are added to 500 g. of sulphuric acid monohydrate and the mixture is stirred for 18 hours at 23–25°.

Also, 13.7 g. of α-chloroacrylonitrile and 0.1 g. of hydroquinone are dissolved in 65 g. of 93% sulphuric acid at 20°, this solution is stirred for 3 hours at a temperature of 33–35°, cooled to 10–12°, 7.5 g. of α,α'-dichlorodimethyl ether are added dropwise within 1 hour and then the mixture is stirred, first for 3 hours at 10–12° and then for 4 hours at 13–15°.

These two solutions are then combined and the whole is stirred for 24 hours at 23–25°. The reaction mixture is afterwards poured into a mixture of 1200 g. of ice and 120 g. of sodium chloride and the precipitate obtained is filtered off and washed with a 10% sodium chloride solution. The precipitate is then slurried in 400 ml. of water and the pH of the slurry is adjusted to 7 by the addition of dilute sodium hydroxide solution. 35 g. of sodium chloride are then added to the mixture which is afterwards heated to 60° and the precipitated dyestuff is filtered off and dried at 60° in vacuo.

The dyestuff so obtained corresponds to the formula

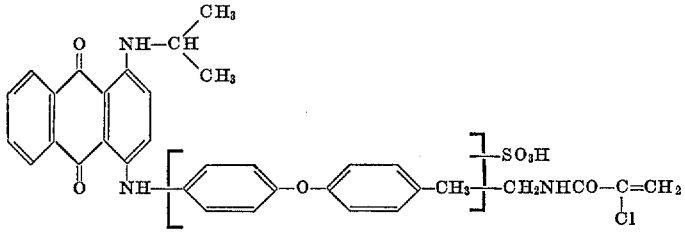

and consists of a mixture of all the isomers falling under the above formula.

It is a blue powder which dissolves easily in water and dyes nylon and wool from a neutral to weakly acid bath in level, greenish blue shades which have good wet and light fastness properties, especially a good fastness to perspiration and washing.

Acid anthraquinone dyestuffs having similar properties are obtained if, with otherwise the same procedure, instead of the 1,4-diamino-anthraquinone compound of the first formula given above, equivalent amounts are used of 1,4-diamino-anthraquinone compounds which are obtained by condensation of 1-(sec. alkylamino)-4-halogen-anthraquinones given in column I of Table I with the aminodiphenyl ethers, aminodiphenyl thioethers, aminodiphenyl alkanes or aminodiphenyl cycloalkanes given in column II of the same table.

Acid anthraquinone dyestuffs having similar properties are also obtained if, instead of α-chloroacrylonitrile, equivalent amounts of the nitriles or amides given in the following Table III are used:

TABLE III

| | |
|---|---|
| 82 | $CH_2{=}C(Br){-}CN$ |
| 83 | $ClCH{=}CH{-}CN$ |
| 84 | $BrCH{=}CH{-}CN$ |
| 85 | $CH_2{=}CH{-}CN$ |
| 86 | $CH_2{=}C(CH_3){-}CN$ |
| 87 | $H_3C{-}CH{=}C(Cl){-}CONH_2$ |
| 88 | $H_3C{-}C(Cl){=}CH{-}CONH_2$ |
| 89 | $Cl{-}CH_2{-}CH{=}CH{-}CONH_2$ |
| 90 | $H_3C{-}CH{=}C(Br){-}CONH_2$ |
| 91 | $H_3C{-}C(Br){=}CH{-}CONH_2$ |
| 92 | $Br{-}CH_2{-}CH{=}CH{-}CONH_2$ |

EXAMPLE 93

100 g. of wool flannel are introduced at 40–45° into a lyebath which contains 2 g. of the dyestuff according to Example 2, 5 g. of ammonium acetate and 10 g. of sodium ulphate in 3,000 ml. of water. The bath is then evenly aised to the light boil within 30 minutes and kept for anther 30 minutes at the boil. A very level, greenish blue vool dyeing having good wet and light fastness is obained.

EXAMPLE 94

100 g. of nylon-66 fabric "Nyltest" are placed in a beam lyeing machine which contains 3.2 g. of dyestuff according o Example 2, 2 g. of a dyeing auxiliary consisting of 32 parts of a polyglycolether of 1 mol octadecyldiethylene triamine, 2 mols styrene oxide and 100 mols ethylene oxide, 10 parts of hexamethylenetetramine and 48 parts of water, and 3 g. of ammonium sulfate in 2000 ml. of water. The apparatus is closed and then the temperature is gradually aised to 130° within 30 minutes whereupon dyeing is performed for 30 minutes at this temperature. After cooling, he fabric is taken from the machine, rinsed first with varm and then with cold water and dried. In this way a very level greenish-blue dyeing which is not striped is obained. It has very good fastness to washing, light and perpiration.

EXAMPLE 95

A homogeneous mixture of 50.4 g. of 1,4-diaminoanthraquinone of the formula

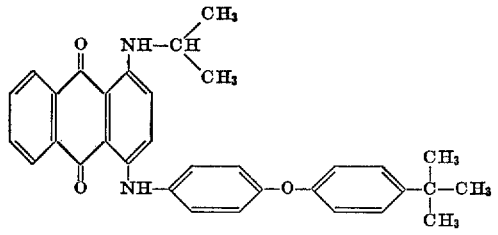

and 14.90 g. of N-methylol α-chloro-acrylylamide are added to 300 g. of 23–25° warm 96% sulphuric acid and the solution obtained is stirred for 18 hours at the ame temperature. 130 g. of 66% oleum are then added dropwise to the solution while cooling at 25° and the whole is then stirred for 6 hours at the same temperaure. The solution is then poured into a mixture of ice and sodium chloride, the precipitated dyestuff is filtered off and washed with 10% sodium chloride solution. The product is further worked up as described in Example 1. A dyestuff, the dyeing properties of which are identical with those of the dyestuff produced as described in Example 5 and which corresponds to the formula

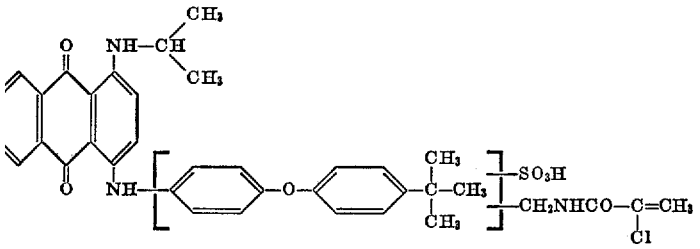

and consists of a mixture of all the isomers falling under he above formula, is obtained.

EXAMPLE 96

100 g. of texturized nylon 66 jersey are introduced, at a temperature of 40°, into a dyebath containing 2 g. of the dyestuff produced according to Example 2, 2 g. of acetic acid, 2 g. of the sodium salt of sulfated ricinoleic acid-butyl ester and 0.5 g. of a mixture of urea and the condensation product of stearylamine with 20 mol of ethyleneoxide, in 5000 ml. of water. The inner temperature is evenly raised to boiling during half an hour, whereupon dyeing is carried out for one hour with light boiling. The jersey is then rinsed and dried. A green-blue, non-streaky dyeing is obtained which is very fast to washing, light and perspiration.

EXAMPLE 97

14.64 parts of 1-cyclohexylamino-4-(4'-phenoxyphenylamino)-anthraquinone of the formula

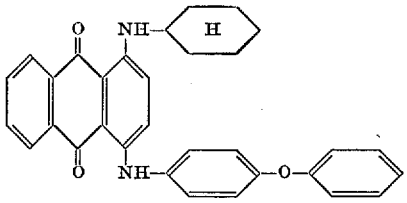

are mixed at 0–5° with 4.25 parts of N-methylol α-chloroacrylylamide and the mixture is added to 150 parts of 90% sulfuric acid. The whole is stirred for 24 hours at the same temperature, whereupon the solution is poured onto ice, the precipitate obtained is filtered off and dried. The condensation product, on being sulfonated for 24 hours at 15–18° in 10% oleum, produces a dyestuff which contains about one sulfonic acid group per molecule.

The same dyestuff is obtained by dissolving the 14.64 parts of the aforesaid starting material in sulfuric acid monohydrate and stirring the solution for 18 hours at 23 to 25°, whereby the starting material is monosulfonated, whereupon the above-stated amount of N-methylol α-chloro-acrylylamide is added and the mixture stirred for 24 hours at 23 to 25°. The product is then precipitated by pouring onto ice and further isolated as described above.

The resulting dyestuff of the formula

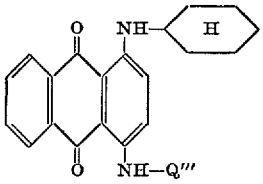

(A)

wherein Q''' represents monosulfonated p-phenoxyphenyl substituted at one of its $SO_3H$-free carbon atoms by the grouping $—CH_2—NH—CO—CCl=CH_2$, dyes wool and man-made polyamide fibers in greenish-blue shades from a weakly acid bath; the dyeings are fast to washing, e.g. with water, and to alkaline milling. In addition, the resulting dyestuff has a very good migratory power.

This dyestuff consists of a mixture of all the isomers falling under the formula

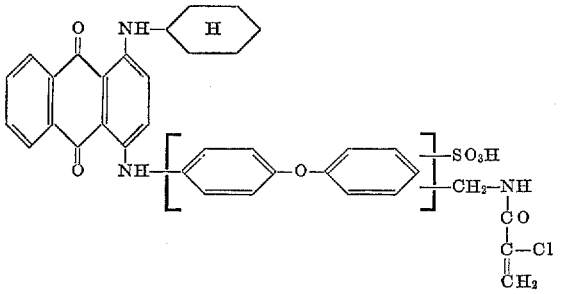

(B)

The individual isomers of such sulfonated anthraquinone dyes serving as acid wool dyes for exhaustion dyeing are known to have the same fastness properties as the mixture thereof and their isolation from such mixture, which could be effected by the known chromatographic techniques, would therefore be of no interest, and, moreover, very uneconomical.

By using in the above example, under otherwise the same conditions, 15.12 parts of 1-cyclohexylamino-4(4'-phenylthio-phenylamino)-anthraquinone, or 15.06 parts of 1 - cyclohexylamino-4-[4'-(p-methyl-phenoxy)-phenylamino]-anthraquinone, or 15.54 parts of 1-cyclohexylamino-4-[4'-(p - methyl-phenylthio) - phenylamino]-anthraquinone or 15.48 parts of 1-cyclohexylamino-4-(2', 6'-dimethyl-4'-phenoxy - phenylamino) - anthraquinone, the dyestuffs having corresponding constitutions and similar properties are obtained. Thus, Q''' represents in these dyestuffs 4'-phenylthio-phenyl, 4'-(p-methyl-phenoxy)-phenyl, 4'-(p-methyl-phenylthio)-phenyl or 2',6'-dimethyl-4'-phenoxy-phenyl, respectively, and is in each case monosulfonated and substituted, at a $SO_3H$-free carbon atom, by the grouping $$—CH_2—NH—CO—CCl{=}CH_2$$

A substantial portion of each of these dyestuffs consists of the corresponding isomers analogous to those of Formula B.

The dyestuff B of Example 97 is also obtained by the following procedure:

48.8 g. of 1,4-diaminoanthraquinone of the formula

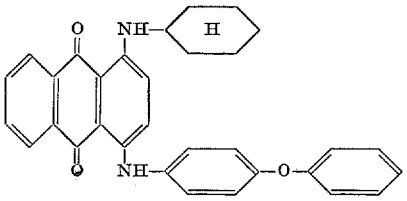

are added to 500 g. of sulfuric acid monohydrate and the mixture is stirred for 18 hours at 23 to 25°.

Also, 13.7 g. of α-chloroacrylonitrile and 0.1 g. of hydroquinone are dissolved in 65 g. of 20° warm 93% sulfuric acid, this solution is stirred for 3 hours at a temperature of 33 to 35°, cooled to 10 to 12°, then 7.5 g. of α,α'-dichlorodimethyl ether are added dropwise within 1 hour and finally the mixture is stirred, first for 3 hours at 10 to 12° and then for 4 hours at 13 to 15°.

Both these solutions are then combined and the whole is stirred for 24 hours at 23 to 25°. The reaction mixture is then poured onto a mixture of 1200 g. of ice and 120 g. of sodium chloride, the precipitate formed is filtered off and washed with a 10% sodium chloride solution. The precipitate is slurried in 400 ml. of water and the pH of the slurry is adjusted to 7 by the addition of dilute sodium hydroxide solution. 35 g. of sodium chloride are then added to the mixture, the whole is heated to 60°, the dyestuff formed is filtered off and dried at 60° in vacuo.

We claim:

1. A fiber-reactive anthraquinone dyestuff of the formula

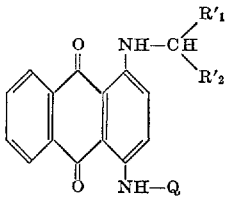

wherein:

$R_1'$ represents methyl,
$R_2'$ represents methyl or ethyl, or
$R_1'$ and $R_2'$ taken together with the

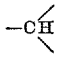

group to which they are linked represent cyclohexyl, Q represents phenoxyphenyl, alkyl-substituted phenoxyphenyl, bromo-substituted phenoxyphenyl, chloro-substituted phenoxyphenyl, phenylthio-phenyl, alkyl-substituted phenylthio-phenyl, chloro-substituted phenylthio-phenyl, bromo-substituted phenylthio-phenyl, benzyl-phenyl, alkyl-substituted benzyl-phenyl, chloro-substituted benzyl-phenyl and bromo-substituted benzyl-phenyl, alkyl in the aforesaid radicals substituted therewith having from 1 to 5 carbon atoms, and wherein Q is substituted at ring carbon atoms with (a) one —$CH_2$—NH—CO—Y fiber-reactive grouping, wherein Y represents unsubstituted lower alkenyl, or chloro- or bromo-substituted lower alkenyl, and (b) one to two sulfonic acid groups.

2. A dyestuff as defined in claim 1, wherein Y represents

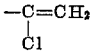

3. A dyestuff as defined in claim 2, wherein each of $R'_1$ and $R'_2$ is methyl, and Q represents monosulfonated 4-phenoxyphenyl.

4. A dyestuff as defined in claim 2, wherein each of $R'_1$ and $R'_2$ is methyl, and Q represents monosulfonated 4-(4'-methylphenoxy)-phenyl.

5. A dyestuff as defined in claim 2, wherein

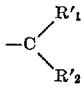

represents cyclohexyl, and Q is monosulfonated 4-(4'-methylphenoxy)-phenyl.

References Cited

The following references, cited by the Examiner, are of record in the patented file of this patent or the original patent.

UNITED STATES PATENTS

| | | | |
|---|---|---|---|
| 2,029,007 | 1/1936 | Weinand | 260—374 |
| 2,419,405 | 4/1947 | Klein | 260—380 |
| 2,659,737 | 11/1953 | Peter et al. | 260—374 |
| 2,740,796 | 4/1956 | Singer et al. | 260—372 |
| 2,870,173 | 1/1959 | Hindermann et al. | 260—374 |

LORRAINE A. WEINBERGER, Primary Examiner

E. J. SKELLY, Assistant Examiner

U.S. Cl. X.R.

8—39: 260—374, 378, 381